(12) United States Patent
Turley et al.

(10) Patent No.: US 8,543,710 B2
(45) Date of Patent: Sep. 24, 2013

(54) METHOD AND SYSTEM FOR CONTROLLING NETWORK ACCESS

(75) Inventors: Patrick Turley, Austin, TX (US); Keith Johnston, Austin, TX (US); Steven D. Tonnesen, Cedar Park, TX (US)

(73) Assignee: RPX Corporation, San Francisco, CA (US)

( * ) Notice: Subject to any disclaimer, the term of this patent is extended or adjusted under 35 U.S.C. 154(b) by 1889 days.

(21) Appl. No.: 11/076,591

(22) Filed: Mar. 10, 2005

(65) Prior Publication Data

US 2005/0204050 A1    Sep. 15, 2005

Related U.S. Application Data

(60) Provisional application No. 60/551,702, filed on Mar. 10, 2004.

(51) Int. Cl.
*G06F 15/173*    (2006.01)
*G06F 9/00*    (2006.01)

(52) U.S. Cl.
USPC ............. 709/229; 709/224; 709/225; 726/1; 726/2; 726/11; 726/22

(58) Field of Classification Search
USPC ................ 709/229, 224, 225; 726/1, 2, 4, 726/6, 11, 22, 26–30
See application file for complete search history.

(56) References Cited

U.S. PATENT DOCUMENTS

| | | | |
|---|---|---|---|
| 5,623,601 A | 4/1997 | Vu | |
| 5,673,393 A | 9/1997 | Marshall et al. | |
| 5,706,427 A | 1/1998 | Tabuki | |
| 5,748,901 A | 5/1998 | Afek et al. | |
| 5,835,727 A | 11/1998 | Wong et al. | |
| 5,878,231 A | 3/1999 | Baehr et al. | |
| 5,896,499 A | 4/1999 | McKelvey | |
| 5,901,148 A | 5/1999 | Bowen et al. | |
| 5,936,542 A | 8/1999 | Kleinrock et al. | |
| 5,953,506 A | 9/1999 | Kalra et al. | |
| 5,987,134 A | 11/1999 | Shin et al. | |

(Continued)

FOREIGN PATENT DOCUMENTS

| | | |
|---|---|---|
| EP | 0587522 B1 | 1/2000 |
| WO | WO 01/77787 A3 | 10/2001 |

(Continued)

OTHER PUBLICATIONS

U.S. Patent Office Official Action issued Jan. 25, 2008 in U.S. Appl. No. 11/076,652, Steven D. Tonnesen, Jan. 25, 2008.

(Continued)

*Primary Examiner* — Alina N. Boutah
(74) *Attorney, Agent, or Firm* — Howison & Arnott, L.L.P.

(57) ABSTRACT

Systems and methods intended to control a network devices access to a network are disclosed. Embodiments of the current invention expose a method for confining a network client's network access to a specific logical region of the network. A network communication may be received and the client that originated this communication determined. This client is associated with a set of rules or walled garden that specifies the access allowed by that client. The destination of the communication may also be determined and if the destination is allowed by the set of rules associated with the client and access to the destination allowed if access to the destination is allowed by the set of rules.

20 Claims, 1 Drawing Sheet

EXAMPLE GATEWAY CONFIGURATION

| CLIENT IDENTITY | ALLOWED TO ACCESS ADDRESSES IN: | ACTION FOR WEB REQUESTS OUTSIDE ALLOWED ADDRESSES: |
|---|---|---|
| CLIENT 1 | INTERNET | (NONE) |
| CLIENT 2 | WALLED GARDEN "A" | REDIRECT TO ADDRESS OF SITE "Q" |
| CLIENT 3 | WALLED GARDENS "A" AND "B" | REDIRECT TO ADDRESS OF SITE "Q" |
| CLIENT 4 | WALLED GARDEN "D" | (NONE) |
| ○ | ○ | ○ |
| ○ | ○ | ○ |
| ○ | ○ | ○ |

200

(56) References Cited

U.S. PATENT DOCUMENTS

| | | | | |
|---|---|---|---|---|
| 5,996,013 | A | 11/1999 | Delp et al. | |
| 6,085,241 | A | 7/2000 | Otis | |
| 6,088,451 | A | 7/2000 | He et al. | |
| 6,092,200 | A | 7/2000 | Muniyappa et al. | |
| 6,108,782 | A | 8/2000 | Fletcher et al. | |
| 6,130,892 | A | 10/2000 | Short et al. | |
| 6,131,116 | A | 10/2000 | Riggins et al. | |
| 6,157,953 | A | 12/2000 | Chang et al. | |
| 6,173,331 | B1 | 1/2001 | Shimonishi | |
| 6,176,883 | B1 | 1/2001 | Holloway et al. | |
| 6,185,567 | B1 | 2/2001 | Ratnaraj et al. | |
| 6,194,992 | B1 | 2/2001 | Short et al. | |
| 6,205,552 | B1 | 3/2001 | Fudge | |
| 6,212,558 | B1 | 4/2001 | Antur et al. | |
| 6,219,706 | B1 * | 4/2001 | Fan et al. | 709/225 |
| 6,226,752 | B1 | 5/2001 | Gupta et al. | |
| 6,233,607 | B1 | 5/2001 | Taylor et al. | |
| 6,243,815 | B1 | 6/2001 | Antur et al. | |
| 6,266,774 | B1 | 7/2001 | Sampath et al. | |
| 6,275,693 | B1 | 8/2001 | Lin et al. | |
| 6,295,294 | B1 | 9/2001 | Odlyzko | |
| 6,321,339 | B1 | 11/2001 | French et al. | |
| 6,324,648 | B1 | 11/2001 | Grantges, Jr. | |
| 6,336,133 | B1 | 1/2002 | Morris et al. | |
| 6,404,743 | B1 | 6/2002 | Meandzija | |
| 6,421,319 | B1 | 7/2002 | Iwasaki | |
| 6,463,474 | B1 | 10/2002 | Fuh et al. | |
| 6,473,793 | B1 | 10/2002 | Dillon et al. | |
| 6,473,801 | B1 | 10/2002 | Basel | |
| 6,477,143 | B1 | 11/2002 | Ginossar | |
| 6,502,131 | B1 | 12/2002 | Vaid et al. | |
| 6,502,135 | B1 | 12/2002 | Munger et al. | |
| 6,516,417 | B1 | 2/2003 | Pegrum et al. | |
| 6,535,879 | B1 | 3/2003 | Behera | |
| 6,539,431 | B1 | 3/2003 | Sitaraman et al. | |
| 6,631,416 | B2 | 10/2003 | Bendinelli et al. | |
| 6,636,894 | B1 | 10/2003 | Short et al. | |
| 6,643,260 | B1 | 11/2003 | Kloth et al. | |
| 6,678,733 | B1 | 1/2004 | Brown et al. | |
| 6,708,212 | B2 | 3/2004 | Porras et al. | |
| 6,732,179 | B1 | 5/2004 | Brown et al. | |
| 6,735,691 | B1 | 5/2004 | Capps et al. | |
| 6,748,439 | B1 * | 6/2004 | Monachello et al. | 709/229 |
| 6,757,740 | B1 | 6/2004 | Parekh et al. | |
| 6,763,468 | B2 | 7/2004 | Gupta et al. | |
| 6,785,252 | B1 | 8/2004 | Zimmerman et al. | |
| 6,789,110 | B1 | 9/2004 | Short et al. | |
| 6,789,118 | B1 | 9/2004 | Rao | |
| 6,798,746 | B1 | 9/2004 | Kloth et al. | |
| 6,804,783 | B1 | 10/2004 | Wesinger et al. | |
| 6,816,903 | B1 | 11/2004 | Rakoshitz et al. | |
| 6,823,385 | B2 | 11/2004 | McKinnon et al. | |
| 6,834,341 | B1 | 12/2004 | Bahl et al. | |
| 6,839,759 | B2 | 1/2005 | Larson et al. | |
| 6,876,668 | B1 | 4/2005 | Chawla et al. | |
| 6,907,530 | B2 | 6/2005 | Wang | |
| 6,917,622 | B2 | 7/2005 | McKinnon et al. | |
| 6,976,089 | B2 | 12/2005 | Na et al. | |
| 6,983,323 | B2 * | 1/2006 | Cantrell et al. | 709/225 |
| 6,996,625 | B2 | 2/2006 | Kaplan et al. | |
| 7,013,331 | B2 | 3/2006 | Das | |
| 7,085,385 | B2 | 8/2006 | Frantz et al. | |
| 7,085,854 | B2 | 8/2006 | Keane et al. | |
| 7,092,727 | B1 | 8/2006 | Li et al. | |
| 7,100,195 | B1 * | 8/2006 | Underwood | 726/2 |
| 7,120,934 | B2 | 10/2006 | Ishikawa | |
| 7,143,283 | B1 | 11/2006 | Chen et al. | |
| 7,143,435 | B1 | 11/2006 | Droms et al. | |
| 7,146,639 | B2 | 12/2006 | Bartal et al. | |
| 7,181,017 | B1 | 2/2007 | Nagel et al. | |
| 7,181,542 | B2 | 2/2007 | Tuomenoksa et al. | |
| 7,181,766 | B2 | 2/2007 | Bendinelli et al. | |
| 7,185,073 | B1 | 2/2007 | Gai et al. | |
| 7,185,358 | B1 | 2/2007 | Schreiber et al. | |
| 7,185,368 | B2 | 2/2007 | Copeland, III | |
| 7,188,180 | B2 | 3/2007 | Larson et al. | |
| 7,194,554 | B1 | 3/2007 | Short et al. | |
| 7,216,173 | B2 | 5/2007 | Clayton et al. | |
| 7,257,833 | B1 | 8/2007 | Parekh et al. | |
| 7,266,754 | B2 | 9/2007 | Shah et al. | |
| 7,272,646 | B2 | 9/2007 | Cooper et al. | |
| 7,290,050 | B1 * | 10/2007 | Smith et al. | 709/224 |
| 7,290,288 | B2 | 10/2007 | Gregg et al. | |
| 7,310,613 | B2 | 12/2007 | Briel et al. | |
| 7,316,029 | B1 | 1/2008 | Parker et al. | |
| 7,318,097 | B2 * | 1/2008 | Bernoth | 709/225 |
| 7,324,551 | B1 | 1/2008 | Stammers | |
| 7,324,947 | B2 | 1/2008 | Jordan et al. | |
| 7,325,042 | B1 | 1/2008 | Soscia et al. | |
| 7,386,888 | B2 | 6/2008 | Liang et al. | |
| 7,406,530 | B2 | 7/2008 | Brown et al. | |
| 7,418,504 | B2 | 8/2008 | Larson et al. | |
| 7,420,956 | B2 | 9/2008 | Karaoguz et al. | |
| 7,444,669 | B1 | 10/2008 | Bahl et al. | |
| 7,448,075 | B2 | 11/2008 | Morand et al. | |
| 7,454,792 | B2 | 11/2008 | Cantrell et al. | |
| 7,483,993 | B2 * | 1/2009 | Nachenberg et al. | 709/229 |
| 7,490,151 | B2 | 2/2009 | Munger et al. | |
| 7,587,512 | B2 | 9/2009 | Ta et al. | |
| 7,590,728 | B2 | 9/2009 | Tonnesen et al. | |
| 7,610,621 | B2 | 10/2009 | Turley et al. | |
| 7,624,438 | B2 | 11/2009 | White | |
| 7,634,805 | B2 | 12/2009 | Aroya | |
| 7,665,130 | B2 | 2/2010 | Johnston et al. | |
| 7,792,963 | B2 * | 9/2010 | Gould et al. | 709/225 |
| 8,032,933 | B2 | 10/2011 | Turley et al. | |
| 8,108,915 | B2 | 1/2012 | White et al. | |
| 8,117,639 | B2 | 2/2012 | MacKinnon et al. | |
| 8,224,983 | B2 | 7/2012 | Ta et al. | |
| 2001/0038639 | A1 | 11/2001 | McKinnon et al. | |
| 2001/0038640 | A1 | 11/2001 | McKinnon et al. | |
| 2001/0038645 | A1 | 11/2001 | McKinnin et al. | |
| 2001/0039576 | A1 | 11/2001 | Kanada | |
| 2001/0039582 | A1 | 11/2001 | McKinnon et al. | |
| 2002/0013844 | A1 | 1/2002 | Garrett et al. | |
| 2002/0021665 | A1 | 2/2002 | Bhagavath et al. | |
| 2002/0023160 | A1 | 2/2002 | Garrett et al. | |
| 2002/0023210 | A1 | 2/2002 | Tuomenoksa et al. | |
| 2002/0026503 | A1 | 2/2002 | Bendinelli et al. | |
| 2002/0026531 | A1 | 2/2002 | Keane et al. | |
| 2002/0029260 | A1 | 3/2002 | Dobbins et al. | |
| 2002/0029276 | A1 | 3/2002 | Bendinelli et al. | |
| 2002/0035699 | A1 | 3/2002 | Crosbie | |
| 2002/0042883 | A1 | 4/2002 | Roux et al. | |
| 2002/0046264 | A1 | 4/2002 | Dillon et al. | |
| 2002/0052950 | A1 | 5/2002 | Pillai et al. | |
| 2002/0053031 | A1 | 5/2002 | Bendinelli et al. | |
| 2002/0055968 | A1 | 5/2002 | Wishoff et al. | |
| 2002/0056008 | A1 | 5/2002 | Keane et al. | |
| 2002/0059408 | A1 | 5/2002 | Pattabhiraman et al. | |
| 2002/0075844 | A1 | 6/2002 | Hagen | |
| 2002/0085719 | A1 | 7/2002 | Crosbie | |
| 2002/0087713 | A1 | 7/2002 | Cunningham | |
| 2002/0090089 | A1 | 7/2002 | Branigan | |
| 2002/0091859 | A1 | 7/2002 | Tuomenoksa et al. | |
| 2002/0091944 | A1 | 7/2002 | Anderson et al. | |
| 2002/0099829 | A1 | 7/2002 | Richards et al. | |
| 2002/0112183 | A1 | 8/2002 | Baird, III et al. | |
| 2002/0112186 | A1 | 8/2002 | Ford et al. | |
| 2002/0120741 | A1 | 8/2002 | Webb et al. | |
| 2002/0123335 | A1 | 9/2002 | Luna et al. | |
| 2002/0124078 | A1 | 9/2002 | Conrad | |
| 2002/0124103 | A1 | 9/2002 | Maruyama et al. | |
| 2002/0129143 | A1 | 9/2002 | McKinnon, III et al. | |
| 2002/0131404 | A1 | 9/2002 | Mehta et al. | |
| 2002/0132607 | A1 * | 9/2002 | Castell et al. | 455/412 |
| 2002/0133581 | A1 | 9/2002 | Schwartz et al. | |
| 2002/0133586 | A1 | 9/2002 | Shanklin et al. | |
| 2002/0133589 | A1 | 9/2002 | Gubbi et al. | |
| 2002/0136226 | A1 | 9/2002 | Christoffel et al. | |
| 2002/0138631 | A1 * | 9/2002 | Friedel et al. | 709/229 |
| 2002/0138762 | A1 | 9/2002 | Horne | |
| 2002/0138763 | A1 | 9/2002 | Delany et al. | |
| 2002/0143964 | A1 | 10/2002 | Guo et al. | |

| | | |
|---|---|---|
| 2002/0152284 A1 | 10/2002 | Cambray et al. |
| 2002/0162030 A1 | 10/2002 | Brezak et al. |
| 2002/0164952 A1 | 11/2002 | Singhai et al. |
| 2002/0165949 A1 | 11/2002 | Na et al. |
| 2002/0165990 A1 | 11/2002 | Singhai et al. |
| 2002/0169867 A1 | 11/2002 | Mann et al. |
| 2002/0174227 A1 | 11/2002 | Hartsell et al. |
| 2002/0178282 A1 | 11/2002 | Mysore et al. |
| 2002/0199007 A1 | 12/2002 | Clayton et al. |
| 2003/0041104 A1 | 2/2003 | Wingard et al. |
| 2003/0043846 A1 | 3/2003 | Purpura et al. |
| 2003/0046370 A1 | 3/2003 | Courtney |
| 2003/0055962 A1 * | 3/2003 | Freund et al. ............... 709/225 |
| 2003/0055994 A1 * | 3/2003 | Herrmann et al. ............ 709/229 |
| 2003/0059038 A1 | 3/2003 | Meyerson et al. |
| 2003/0061506 A1 | 3/2003 | Cooper et al. |
| 2003/0069955 A1 | 4/2003 | Gieseke et al. |
| 2003/0069956 A1 | 4/2003 | Gieseke et al. |
| 2003/0070170 A1 | 4/2003 | Lennon |
| 2003/0078784 A1 | 4/2003 | Jordan et al. |
| 2003/0087629 A1 | 5/2003 | Juitt et al. |
| 2003/0110073 A1 | 6/2003 | Briel et al. |
| 2003/0115247 A1 | 6/2003 | Simpson et al. |
| 2003/0123442 A1 | 7/2003 | Drucker et al. |
| 2003/0126608 A1 | 7/2003 | Safadi et al. |
| 2003/0135753 A1 | 7/2003 | Batra et al. |
| 2003/0149751 A1 | 8/2003 | Bellinger et al. |
| 2003/0154399 A1 | 8/2003 | Zuk et al. |
| 2003/0159072 A1 | 8/2003 | Bellinger et al. |
| 2003/0163603 A1 | 8/2003 | Fry et al. |
| 2003/0172167 A1 * | 9/2003 | Judge et al. .................... 709/229 |
| 2003/0172291 A1 * | 9/2003 | Judge et al. .................... 713/200 |
| 2003/0177477 A1 | 9/2003 | Fuchs |
| 2003/0182420 A1 | 9/2003 | Jones et al. |
| 2003/0191966 A1 * | 10/2003 | Gleichauf .................... 713/201 |
| 2003/0212800 A1 | 11/2003 | Jones et al. |
| 2003/0212900 A1 | 11/2003 | Liu et al. |
| 2003/0217126 A1 | 11/2003 | Polcha et al. |
| 2004/0015719 A1 | 1/2004 | Lee et al. |
| 2004/0047356 A1 | 3/2004 | Bauer |
| 2004/0049586 A1 | 3/2004 | Ocepek et al. |
| 2004/0064351 A1 | 4/2004 | Mikurak |
| 2004/0064560 A1 | 4/2004 | Zhang et al. |
| 2004/0064836 A1 | 4/2004 | Ludvig et al. |
| 2004/0073941 A1 | 4/2004 | Ludvig et al. |
| 2004/0083295 A1 | 4/2004 | Amara et al. |
| 2004/0085906 A1 | 5/2004 | Ohtani et al. |
| 2004/0093513 A1 | 5/2004 | Cantrell et al. |
| 2004/0103426 A1 | 5/2004 | Ludvig et al. |
| 2004/0107290 A1 | 6/2004 | Kaplan et al. |
| 2004/0122956 A1 | 6/2004 | Myers et al. |
| 2004/0172557 A1 | 9/2004 | Nakae et al. |
| 2004/0177276 A1 | 9/2004 | MacKinnon et al. |
| 2004/0179822 A1 | 9/2004 | Tsumagari et al. |
| 2004/0181816 A1 | 9/2004 | Kim et al. |
| 2004/0199635 A1 | 10/2004 | Ta et al. |
| 2004/0210633 A1 | 10/2004 | Brown et al. |
| 2004/0215957 A1 | 10/2004 | Moineau et al. |
| 2004/0268149 A1 | 12/2004 | Aaron |
| 2004/0268234 A1 | 12/2004 | Sampathkumar et al. |
| 2005/0021686 A1 | 1/2005 | Jai et al. |
| 2005/0021975 A1 | 1/2005 | Liu |
| 2005/0044350 A1 | 2/2005 | White et al. |
| 2005/0044422 A1 | 2/2005 | Cantrell et al. |
| 2005/0050338 A1 * | 3/2005 | Liang et al. .................... 713/188 |
| 2005/0066200 A1 | 3/2005 | Bahl et al. |
| 2005/0091303 A1 | 4/2005 | Suzuki |
| 2005/0138358 A1 | 6/2005 | Bahl et al. |
| 2005/0138416 A1 * | 6/2005 | Qian et al. .................... 713/201 |
| 2005/0149721 A1 | 7/2005 | Lu et al. |
| 2005/0193103 A1 | 9/2005 | Drabik |
| 2005/0195854 A1 | 9/2005 | Agmon et al. |
| 2005/0204022 A1 | 9/2005 | Johnston et al. |
| 2005/0204031 A1 | 9/2005 | Johnston et al. |
| 2005/0204168 A1 | 9/2005 | Johnston et al. |
| 2005/0204169 A1 | 9/2005 | Tonnesen |
| 2005/0204402 A1 | 9/2005 | Turley et al. |
| 2006/0036723 A1 | 2/2006 | Yip et al. |
| 2006/0117384 A1 * | 6/2006 | Larson et al. .................... 726/22 |
| 2006/0168229 A1 | 7/2006 | Shim et al. |
| 2006/0168454 A1 | 7/2006 | Venkatachary et al. |
| 2006/0173992 A1 | 8/2006 | Weber et al. |
| 2006/0184618 A1 | 8/2006 | Kurup et al. |
| 2007/0073718 A1 | 3/2007 | Ramer et al. |
| 2007/0186113 A1 | 8/2007 | Cuberson et al. |
| 2007/0208936 A1 | 9/2007 | Ramos Robles |
| 2007/0268878 A1 | 11/2007 | Clements |
| 2008/0066096 A1 | 3/2008 | Wollmershauser et al. |
| 2008/0098464 A1 | 4/2008 | Mizrah |
| 2008/0120661 A1 | 5/2008 | Ludvig et al. |
| 2008/0147840 A1 | 6/2008 | Roelens et al. |
| 2008/0276305 A1 | 11/2008 | Chan et al. |
| 2009/0279567 A1 | 11/2009 | Ta et al. |
| 2010/0064356 A1 | 3/2010 | Johnston et al. |
| 2010/0192213 A1 | 7/2010 | Ta et al. |
| 2011/0219444 A1 | 9/2011 | Turley et al. |
| 2011/0258687 A1 | 10/2011 | White et al. |
| 2012/0096517 A1 | 4/2012 | White et al. |
| 2012/0117615 A1 | 5/2012 | MacKinnon et al. |

FOREIGN PATENT DOCUMENTS

| | | |
|---|---|---|
| WO | WO 02/09458 A2 | 1/2002 |
| WO | WO 02/23825 A1 | 3/2002 |
| WO | WO 02/41587 A2 | 5/2002 |
| WO | WO 02/077820 A1 | 10/2002 |
| WO | WO 03/021890 A1 | 3/2003 |
| WO | WO 03/098461 A2 | 5/2003 |
| WO | WO 2004/034229 A2 | 4/2004 |
| WO | WO 2004/036371 A2 | 4/2004 |
| WO | WO 2005/020035 A2 | 3/2005 |

OTHER PUBLICATIONS

U.S. Patent Office Action issued Apr. 17, 2008, in U.S. Appl. No. 10/687,002, Tuan Ta, 13 pages.
U.S. Appl. No. 08/816,174, Short et al.
U.S. Appl. No. 09/458,569, Short et al.
U.S. Appl. No. 09/458,602, Pagan et al.
U.S. Appl. No. 09/541,877, Short et al.
U.S. Appl. No. 09/821,565, Ishikawa.
U.S. Appl. No. 09/881,147, Cooper et al.
U.S. Appl. No. 10/000,396, Copeland.
U.S. Appl. No. 10/072,683, Zuk et al.
U.S. Appl. No. 10/195,326, Lee et al.
U.S. Appl. No. 10/236,402, Bauer.
U.S. Appl. No. 10/291,095, Cantrell et al.
U.S. Appl. No. 10/469,206, Ohtani et al.
U.S. Appl. No. 10/641,494, Valluri.
U.S. Appl. No. 10/643,864, Nakae et al.
U.S. Appl. No. 10/709,423, Lu et al.
U.S. Appl. No. 10/930,392, Cantrell et al.
U.S. Appl. No. 10/930,922, Cantrell et al.
U.S. Appl. No. 10/953,326, Suzuki.
U.S. Patent Office Action issued Jun. 9, 2008, in U.S. Appl. No. 10/683,317, Richard MacKinnon, 15 pages.
Fan et al, "Distributed Real Time Intrusion Detection System for 3G", 2004, pp. 1566-1570.
Yu et al., "Fuzzy Logic Based Adaptive Congestion Control Scheme for High-Speed Network", Aug. 2004, pp. 389-393.
Hamano et al., A Redirections-Based Defense Mechanism Against Flood-Type Attacks in Large Scale ISP Networks, 2004, pp. 543-547.
Sarolahti, "Congestion Control on Spurious TCP Retransmssion Timeouts," 2003, pp. 682-686.
Estevez-Tapiador et al., "Measuring Normality in HTTP Traffic for Anomaly-Based Intrusion Detection", Jun. 6, 2004, pp. 175-193.
Xing et al., "A Survey of Computer Vulnerability Assessment", Jan. 2004, pp. 1-11.
Wen et al. "Development of a Snort-Based Security Network Management and Real-Time Intrusion Detection System", Feb. 2004, pp. 40-43.
Thottethodi et al., "Exploiting Global Knowledge to Achieve Self-Tuned Congestion Control for K-ary n-cube Networks", Mar. 2004, pp. 257-272.

Trabelsi et al., "Malicious Sniffing Systems Detection Platform", 2004, pp. 201-207.
Guangzhi et al., "A Framework for Network Vulnerability Analysis", 2002, pp. 289-294.
Albuquerque et al., "Network Border Patrol: Preventing Congestion Collapse and Promoting Fairness in the Internet", Feb. 2004, pp. 173-186.
Wirbel, Loring, "Security Stampede Could Flatten IPSec", Jan. 2004, p. 12.
MacLeod, Calum, "Freeing the Shackles with Secure Remote Working", 2003, pp. 66-67.
Fisher, D., "SSL Simplifies VPN Security", Nov. 10, 2003, p. 40.
Conry-Murray, A., "SSL VPNs: Remote Access for the Masses", Oct. 2003, pp. 26-32.
"Permeo Supports Microsoft Network Access Protection for Simplified Secure Remote Access; Permeo's Base5 Support for Microsoft Tech. Provides Zero Touch" Policy Enforcement.
No author, Permeo Drives Out Operational Costs, Simplifies Secure Remote Access, Mar. 28, 2005, pp. NA.
No author, Netilla Lauches SSL VPN for Citrix. (Industry Briefs) (Virtual Private Networks) (Brief Article), Sep. 20, 2004, p. 43.
Netilla Lauches Secure Gateway Appliance Family of Application-Specific SSL VPN Products; Initial SGA-C Model Provides Secure Remote Access to Citrix MetaFrame Presentation.
No author, "Secure Remote Access (Network Security) (VPN Gateway 4400 Series) (Brief Article)", Mar. 1, 2004, p. 50.
Fortinet and Aventail Deliver Joint Solution for Clientless Remote Access with High-Performance Antivirus Protection; Integrated SSL VPN and Antivirus Offering Provides.
Hamblen, Matt, "Cisco Targets SSL VPN Vendors, Adds Support for Clientless Security Protoccol: Installed Base of VPN Devices May Give it an Edge, Despite Late Entry (News)".
International Search Report and Written Opinion for related International Application No. PCT/US04/29249, Dec. 15, 2005.
Stone, David, "Securing Wireless LANs with VPN," May 2006, pp. NA.
Hamzeh, et al., "Point-to-Point Tunneling Protocol—PPTP RFC 2637" Network Working Group, Jul. 1999, pp. 1-54.
Pfleeger, Charles P., Security in Computing, PTR Prentice-Hall, Inc., 1989, Ch. 10.
International Search Report for PCT/US03/32912, Apr. 8, 2004.
Lingblom, "Granite Develops SMB Strategy," CRN, San Jose, CA, Jun. 23, 2003.
"Boingo Wireless Service Installed at LaGuardia Airport" Copyright 2003 M2Communications Ltd., found at www.findarticles.com, Dec. 8, 2003, 1 page.
West Point Unwired: the Military Academy at West Point Continues to Lead the Way in High-Tech Curriculum with Wireless Classroom Networking Copyright 2003 M2Communications.
Molta, "Wireless Hotspots Heat Up," Mobile & Wireless Technology feature, pp. 1-8, Copyright 2003 M2Communications Ltd., found at www.networkcomputing.com, printed Dec. 8, 2003.
Jackson, "Wireless at West Point: Officers of the Future Use IT in Class Now, in the Field Later (Technology Report)" Apr. 21, 2003, pp. 1-3, www.gcn.com.
Lingblom, "Bluesocket's New Gateway Based on Open Standards—WGX-4000 Switch Wireless Gateway" CRN, Burlington, MA at www.crn.channelsupersearch.com, Apr. 21, 2003.
Dornan, "Wireless LANs: Freedom vs. Security?" Network Magazine, Jul. 2005, pp. 36-39.
O'Shea, "PCTEL looks past patent suite toward fusion of Wi-Fi, PC" Telephony.online, Jun. 2, 2003, pp. 1-2, found at www.telephonyonline.com.
O'Shea, "Boingo to Launch Initiative Aimed at Carrier Market" Telephony.online, Mar. 10, 2003, 1 page, found at www.telephonyonline.com.
International Search Report from PCT/US03/32268 dated Oct. 29, 2004.
U.S. Patent Office Official Action issued Jul. 13, 2007 in U.S. Appl. No. 10/922,041, Eric White.
U.S. Patent Office Official Action issued Oct. 9, 2007 in U.S. Appl. No. 10/683,317, Richard MacKinnon.
U.S. Patent Office Official Action issued Oct. 18, 2007 in U.S. Appl. No. 10/687,002, Tuan Ta.
U.S. Patent Office Official Action issued Oct. 31, 2007 in U.S. Appl. No. 11/078,223, Keith Johnston.
Office Action issued in U.S. Appl. No. 11/076,652 dated Dec. 11, 2008, Tonnesen, 8 pages.
Office Action issued in U.S. Appl. No. 10/687,002 dated Jan. 7, 2009, Ta, 4 pages.
U.S. Patent Office Action issued Jul. 22, 2008, in U.S. Appl. No. 11/076,652, Steven D. Tonnesen, 8 pages.
U.S. Patent Office Action issued Jul. 9, 2008, in U.S. Appl. No. 11/076,672, Keith Johnston, 12 pages.
Office Action issued in U.S. Appl. No. 11/076,719, dated Sep. 4, 2008, Turley, 7 pages.
U.S. Patent and Trademark Office, Office Action issued in U.S. Appl. No. 10/922,041, mailed May 8, 2009, White, 13 Pages.
U.S. Patent and Trademark Office, Office Action issued in U.S. Appl. No. 11/076,672, mailed Jul. 21, 2009, White, 11 Pages.
Office Action issued in U.S. Appl. No. 10/922,041, mailed Dec. 6, 2005, White, 10 pages.
Office Action issued in U.S. Appl. No. 10/922,041, mailed Mar. 30, 2006, White, 18 pages.
Office Action issued in U.S. Appl. No. 10/922,041, mailed Aug. 11, 2006, White, 19 pages.
Office Action issued in U.S. Appl. No. 10/922,041, mailed Jan. 30, 2007, White, 20 pages.
Office Action issued in U.S. Appl. No. 10/683,317, mailed Apr. 5, 2007, MacKinnon, 6 pages.
Office Action issued in U.S. Appl. No. 10/687,002, mailed May 2, 2007, Ta, 10 pages.
Crandell et al., "A Secure and Transparent Firewall Web Proxy," Oct. 2003, USENIX, Retrieved from the internet on Jul. 15, 2009: <URL: http://www.usenix.org/event/lisa03/tech/full_papers/crandell/crandell.pdf>.
Sommerlad, "Reverse Proxy Patterns," 2003 Retrieved from the Internet on Jul. 15, 2009: <URL: http://www.modsecurity.org/archive/ReverseProxy-book-1.pdf>.
Office Action issued in U.S. Appl. No. 10/683,317, mailed Aug. 18, 2009, 17 pages.
Rashti et al, "A Multi-Dimensional Packet Classifier for NP-Based Firewalls," Jan. 2004, retrieved from the Internet on Aug. 12, 2009: <URL: http://ieeexplore.ieee.org/stamp/stamp.jsp?tp=&arnumber=1266123&isnumber=28312>.
Office Action issued in U.S. Appl. No. 11/076,672, mailed Jan. 7, 2010, 9 pgs.
Office Action for U.S. Appl. No. 12/506,140, mailed Aug. 4, 2011, 18 pgs.
Notice of Allowance for U.S. Appl. No. 12/579,566, mailed Aug. 26, 2011, 9 pgs.
Alshamsi, Abdelnasir, et al., "A Technical Comparison of IPSec and SSL," Tokyo University of Technology, Jul. 8, 2004, 10 pages.
Fisher, Dennis, "NetScreen to Acquire Neoteris," IT Security & Network Security News, Oct. 6, 2003, 1 page.
DeMaria, Mike, "Faster Than a Speeding VPN—Super Remote Access With Neoteris IVE," Network Computing, Sep. 9, 2002, printed Nov. 9, 2011 from http://www.networkcomputing.com/data-protection/2296249, 3 pages.
Snyder, Joel, "SSL VPN Gateways," Networkworld, Jan. 12, 2004, printed Nov. 9, 2011 from http://www.networkworld.com/reviews/2004/0112revmain.html, 10 pages.
"NetExtender for SSL-VPN," SonicWALL SSL-VPN NetExtender, Apr. 27, 2006, 30 pages.
"IPSec vs. SSL VPN: Transition Criteria and Methodology," 2007 Sonicwall, 13 pages.
Fisher, Dennis, "Symantec Acquires SSL VPN Vendor," IT Security & Network Security News, Oct. 20, 2003, printed Nov. 9, 2011 from http://www.eweek.com/index2.php?option=content& task=v . . . 1 page.
Notice of Allowance issued in U.S. Appl. No. 12/617,211, mailed Nov. 10, 2011, 8 pages.
Notice of Allowance issued in U.S. Appl. No. 10/683,317, mailed Nov. 28, 2011, 11 pages.

Office Action for U.S. Appl. No. 12/753,390, mailed Dec. 8, 2011, 19 pgs.
Notice of Allowance for U.S. Appl. No. 12/617,211, mailed Dec. 12, 2011, 8 pgs.
Notice of Allowance for U.S. Appl. No. 12/753,390, mailed Mar. 16, 2012, 5 pgs.
"Cisco Common Classification Policy Language," Cisco Router and Security Device Manager 2.4 User's Guide, Ch. 34, 2007, 32 pgs., Cisco Systems, Inc., San Jose, CA.
Office Action for U.S. Appl. No. 12/506,140, mailed Feb. 18, 2011, 13 pgs.
Notice of Allowance for U.S. Appl. No. 12/579,566, mailed Mar. 23, 2011, 12 pgs.
Notice of Allowance for U.S. Appl. No. 12/579,566, mailed May 13, 2011, 8 pgs.
Office Action for U.S. Appl. No. 10/683,317, mailed Jun. 8, 2011, 15 pgs.
Office Action for U.S. Appl. No. 12/617,211, mailed Jul. 19, 2011, 18 pgs.
Office Action for U.S. Appl. No. 12/619,560, mailed May 9, 2012, 7 pgs.
Bauer, Mick, Designing and Using DMZ Networks to Protect Internet Servers, Linux Journal, Mar. 1, 2001, 6 pgs. at http://linuxjournal.com/article/4415, printed Mar. 22, 2012.
Office Action for U.S. Appl. No. 13/092,488, mailed Jun. 11, 2012, 7 pgs.
Office Action for U.S. Appl. No. 13/173,764, mailed Jul. 17, 2012, 15 pgs.
Discussion of Conceptual Difference Between Cisco IOS Classic and Zone-Based Firewalls, Oct. 2007, 4 pgs., Cisco Systems, Inc., San Jose, CA.
Cisco IOS Firewall Zone-Based Policy Firewall, Release 12.4(6)T, Technical Discussion, Feb. 2006, 77 pgs., Cisco Systems, Inc., San Jose, CA.
Zone-Based Policy Firewall Design and Application Guide, Document ID: 98628, Sep. 13, 2007, 49 pgs., Cisco Systems, Inc., San Jose, CA.
"FreeBSD Handbook, Chapter 30 Firewalls," 2003, found at www.freebsd.org/doc/handbook/firewalls-ipfw.html, printed Dec. 27, 2010, 13 pgs.
Watters, Paul, "Solaris 8 Administrator's Guide. Chapter 4, Network Configuration," O'Reilly & Associates, Inc., Jan. 2002, 17 pgs.
Spitzner, Lance, "Configuring network interface cards; getting your interfaces to talk," Mar. 23, 2004, 4 pgs.
Gite, Vivek, "Redhat/CentOS/Fedora Linux Open Port," Sep. 13, 2007, found at www.cyberciti.biz/faq/howto-rhel-linux-open-port-using-iptables/ printed Jan. 3, 2011, 7 pgs.
Office Action for U.S. Appl. No. 10/683,317, dated Jan. 3, 2011, 12 pgs.
SP Maj, W Makairanondh, D Veal, "An Evaluation of Firewall Configuration Methods," IJSCSNS International Journal of Computer Science and Network Security, vol. 10, No. 8, Aug. 2010, 7 pgs.
Using VPN with Zone-Based Policy Firewall, May 2009, Cisco Systems, Inc., San Jose, CA, 10 pgs.
Cisco IOS Firewall Classic and Zone-Based Virtual Firewall Application Configuration Example, Document ID: 100595, Feb. 12, 2008, 20 pgs., Cisco Systems, Inc., San Jose, CA.
Class-Based Policy Provisioning: Introducing Class-Based Policy Language (CPL), Aug. 2008, 36 pgs., Cisco Systems, Inc., San Jose, CA.
Cisco IOS Zone Based Firewall Example, at http://www.linickx.com/archives/2945/cisco-ios-zon . . . , printed Dec. 7, 2010, 6 pgs., LINICKX.com.
Zone-Based Policy Firewall, Published Feb. 22, 2006, Updated Jun. 19, 2006, 46 pgs., Cisco Systems, Inc., San Jose, CA.
Applying Zone-based Firewall Policies in Cisco Security Manager, Published Mar. 2009, Revised Sep. 2009, 64 pgs., Cisco Systems, Inc., San Jose, CA.
Office Action for U.S. Appl. No. 10/683,317, mailed Jul. 23, 2010, 9 pgs.
Office Action for U.S. Appl. No. 12/506,140, mailed Sep. 1, 2010, 11 pgs.
Office Action for U.S. Appl. No. 12/579,566, mailed Oct. 6, 2010, 7 pgs.
Office Action for U.S. Appl. No. 12/617,211, dated Feb. 3, 2011, 14 pgs.
"Managing Firewall Services," User Guide for Cisco Security Manager 3.3.1, Oct. 2009, Ch. 11, 90 pgs., Cisco Systems, Inc., San Jose, CA.
"Cisco Common Classification Policy Language," Cisco Router and Security Device Manager 2.4 User's Guide, Ch. 34, 32 pgs., Cisco Systems, Inc., San Jose, CA.
Guide to User Documentation for Cisco Security Manager 4.0, Jun. 18, 2010, 6 pgs., Cisco Systems, Inc., San Jose, CA.
Cisco Configuration Professional: Zone-Based Firewall Blocking Peer to Peer Traffic Configuration Example, Document ID: 112237, Updated Dec. 3, 2010, 25 pgs., Cisco Systems, Inc., San Jose, CA.
Tuning Cisco IOS Classic and Zone-Based Policy Firewall Denial-of-Service Protection, 2006, 10 pgs., Cisco Systems, Inc., San Jose, CA.
Holuska, Marty, Using Cisco IOS Firewalls to Implement a Network Security Policy, Fort Hays State University/INT 490, printed Dec. 6, 2010, 5 pgs., at http://quasarint.com/Capstone/zb_policy.php.
Cisco Feature Navigator, Cisco Systems, Inc., San Jose, CA, at http://tools.cisco.com/ITDIT/CFN/Dispatch, printed on Dec. 2, 2010, 4 pgs.
SBC Technology Resources, Inc., XNMP-XML Network Management Protocol and Interface, Jul. 19, 2002, pp. 1-9, http://www.ietf.org/proceedings/02jul/slides.
Shim, Choon B., XNMP for IP Telephony Management, Enterprise Networks & Servers, Jun. 2006, pp. 1-7, http://www.enterprisenetworksandservers.com.
Oh et al., Interaction Translation Methods for XML/SNMP Gateway, Jul. 11, 2003, retrieved from . . . http://web-archive.org/web/20030711162412/http://dpnm.postech.ac.kr/papers/DSOM/02/xml-snmp-gateway/xml-snmp-gateway.pdf, pp. 1-5.
Office Action issued in U.S. Appl. No. 11/076,672 dated Feb. 3, 2009, Johnston, 10 pages.
Office Action issued in U.S. Appl. No. 10/683,317 dated Feb. 11, 2009, MacKinnon, 17 pages.
International Preliminary Report on Patentability in PCT/US03/032268 dated Apr. 10, 2005, 3 pages.
International Preliminary Report on Patentability in PCT/US03/032912 dated Apr. 16, 2005, 3 pages.
International Preliminary Report on Patentability and Written Opinion of the International Searching Authority in PCT/US04/029249 dated Feb. 21, 2006, 6 pages.
Office Action issued in U.S. Appl. No. 11/076,719 dated Mar. 17, 2009, 8 pages.

* cited by examiner

METHOD AND SYSTEM FOR CONTROLLING NETWORK ACCESS

RELATED APPLICATIONS

This application claims priority under 35 U.S.C. 119(e) to U.S. Provisional Patent Application No. 60/551,702, filed Mar. 10, 2004, entitled "System and Method for access Scope Control ("Walled Gardens") for Clients of a Network Access Gateway," to Patrick Turley, Keith Johnston, and Steven D. Tonnesen.

TECHNICAL FIELD OF THE INVENTION

Embodiments of the present invention relate generally to network access control and network protocol control.

BACKGROUND

The communication of data over networks has become an important, if not essential, way for many organizations and individuals to communicate. The Internet is a global network connecting millions of computers in which any computer connected to the Internet can potentially receive data from and send data to any other computer connected to the Internet. The Internet provides a variety of methods with which to communicate data, one of the most ubiquitous of which is the World Wide Web. Other methods for communicating data over the Internet include e-mail, usenet newsgroups, telnet, FTP, audio streams, and video streams.

Users typically access the Internet either through a computer connected to an Internet Service Provider ("ISP") or computer connected to a local area network ("LAN") provided by an organization, which is in turn, connected to the ISP. The network service provider provides a point of presence to interface with the Internet backbone. Routers and switches in the backbone direct data traffic between the various ISPs.

As the number of networked devices has increased so, too, has the amount and nature of network traffic. One unfortunate side effect is the evolution of destructive or unauthorized access to the data or operations of networked devices. While the option of simply removing all network access from an abusive or abnormal client remains, business etiquette often predicates the need to constrain a client's access, rather than to remove it. Additionally, when a client device is inadvertently tainted or "infected" by a software virus or worm, the user of the client device may be unaware that the device is abnormally affecting the network. As a result, various methods to detect and limit abnormal or abusive use of network resources or connected devices have resulted in a need to establish a controlled environment in a network in order that abusive or abnormal clients can be constrained.

SUMMARY OF THE INVENTION

Embodiments of the current invention present methods for confining a network client's network access to a specific region of the network.

Embodiments of the present invention allow a service provider to use the network access gateway to constrain a network client's level of network access in a way that can inform the user of the problem and still allow the user access to a limited set of network destinations that may be helpful in resolving the problem (e.g. apply anti-virus software vendors, operating system or security patches, etc.).

Embodiments of the present invention can also be used for other purposes relevant to a network access gateway such as allowing free access to chosen network content, but requiring additional payment or authorization for unrestricted access. An example of this is a public wireless network at a venue that wishes to provide free information about the venue via its own website or affiliated websites, yet requires payment for clients desiring general access to the Internet from the venue.

Embodiments of the present invention may make use of network firewall rule technology, configured to recognize clients by identity or membership in a group. Once classified, traffic from a client can then be subjected to a particular list of access rules, or "walled garden", by which network access is allowed.

A network access gateway can support any number of these walled gardens and can dynamically move clients in and out of these walled gardens based on any status information it maintains, discovers, or is notified about from an external source.

Embodiments of the present invention may offer the technical advantages of a way to reduce the negative effects of virus and worm infections at remote venues, thus helping to preserve the service levels expected by users and to maintain control of a network. Users can also be notified of computer infections and offered a means to seek resolution without requiring direct support from the service provider. Additionally the present invention may offer a dynamic means of selectively allowing clients limited access to content based on identity or membership in a group.

BRIEF DESCRIPTION OF THE FIGURES

A more complete understanding of the present invention and the advantages thereof may be acquired by referring to the following description, taken in conjunction with the accompanying drawings in which like reference numbers indicate like features and wherein.

DETAILED DESCRIPTION

The following applications are hereby fully incorporated by reference herein in their entirety: U.S. application Ser. No. 10/683,317, filed Oct. 10, 2003, entitled "SYSTEM AND METHOD FOR PROVIDING ACCESS CONTROL," by Richard MacKinnon, Kelly Looney, and Eric White; U.S. Provisional Application No. 60/551,698, filed Mar. 10, 2004, entitled "SYSTEM AND METHOD FOR BEHAVIOR-BASED FIREWALL MODELING," by Patrick Turley which converted into U.S. application Ser. No. 11/076,719, filed Mar. 10, 2005, entitled "SYSTEM AND METHOD FOR BEHAVIOR-BASED FIREWALL MODELING," by Richard MacKinnon, Kelly Looney, and Eric White; U.S. Provisional Application No. 60/551,754, filed Mar. 10, 2004, entitled "SYSTEM AND METHOD FOR COMPREHENSIVE CODE GENERATION FOR SYSTEM MANAGEMENT," by Keith Johnston which converted into U.S. application Ser. No. 11/078,223, filed Mar. 10, 2005, entitled "SYSTEM AND METHOD FOR COMPREHENSIVE CODE GENERATION FOR SYSTEM MANAGEMENT," by Keith Johnston; U.S. Provisional Application No. 60/551,703, filed Mar. 10, 2004, entitled "SYSTEM AND METHOD FOR PROVIDING A CENTRALIZED DESCRIPTION/ CONFIGURATION OF CLIENT DEVICES ON A NETWORK ACCESS GATEWAY," by Patrick Turley and Keith Johnston; U.S. Provisional Application No. 60/551,702, filed Mar. 10, 2004, entitled "SYSTEM AND METHOD FOR ACCESS SCOPE CONTROL ("WALLED GARDENS") FOR CLIENTS OF A NETWORK ACCESS GATEWAY," by Patrick Turley, Keith Johnston, and Steven D. Tonnesen; U.S. Provisional Application No. 60/551,699, filed Mar. 10, 2004, entitled "SYSTEM AND METHOD FOR DYNAMIC BANDWIDTH CONTROL," by Patrick Turley, et al.; U.S. Provisional Application No. 60/551,697, filed Mar. 10, 2004, entitled "SYSTEM AND METHOD FOR DETECTION OF ABERRANT NETWORK BEHAVIOR BY CLIENTS OF A NETWORK ACCESS GATEWAY," by Steven D. Tonnesen which converted into U.S. application Ser. No. 11/076,652, filed Mar. 10, 2005, entitled "SYSTEM AND METHOD FOR DETECTION OF ABERRANT NETWORK BEHAVIOR BY CLIENTS OF A NETWORK ACCESS GATEWAY," by Steven D. Tonnesen; U.S. Provisional Application No. 60/551,705, filed Mar. 10, 2004, entitled "SYSTEM AND METHOD FOR DOUBLE-CAPTURE/DOUBLE-REDIRECT TO A DIFFERENT LOCATION," by Keith Johnston, et al. which converted into U.S. application Ser. No. 11/076,646, filed Mar. 10, 2005, entitled "SYSTEM AND METHOD FOR DOUBLE-CAPTURE/DOUBLE-REDIRECT TO A DIFFERENT LOCATION," by Keith Johnston, et al.; U.S. Provisional Application No. 60/551,704, filed Mar. 10, 2004, entitled "SYSTEM AND METHOD FOR NETWORK MANAGEMENT XML ARCHITECTURAL ABSTRACTION," by Keith Johnston and Mario Garcia which converted into U.S. application Ser. No. 11/076,672, filed Mar. 10, 2005, entitled "SYSTEM AND METHOD FOR NETWORK MANAGEMENT XML ARCHITECTURAL ABSTRACTION," by Keith Johnston and Mario Garcia; and U.S. Provisional Application No. 60/551,703, filed Mar. 10, 2005, entitled "SYSTEM AND METHOD FOR PROVIDING A CENTRALIZED DESCRIPTION/ CONFIGURATION OF CLIENT DEVICES ON A NETWORK ACCESS GATEWORK," by Patrick Turley, et al.

Attention is now directed to systems and methods for creating a rules based access system suitable for implementation in a network access gateway. Theses systems and methods may make use of an existing operating system network packet or firewalling subsystem and combines a traffic identification strategy with the application of destination-based access rules to create a controlled environment or "walled garden" capability for a network access gateway. Controlled environments, which limit the network segments or routes available, as well as the network protocol traffic permitted, are known as "walled gardens", where a network client may be constrained in terms of the types of network protocols (and applications) that they are permitted network access, as well as the destinations or services to which network applications may connect.

These systems and methods may also allow any client known to a system to be arbitrarily classified or grouped based on facts known to the system such as assigned client subnet, organizational boundaries, or security standing based on traffic patterns or content. External assignment may also possible.

Embodiments of the current invention disclose methods and systems for confining a network client's network access to a specific logical region of the network. Embodiments of the present invention may make use of traffic discrimination techniques and network protocol filtering to recognize clients by identity or membership in a group. Once classified, traffic from a client can then be subjected to a particular list of access rules that specify a "walled garden" which define where network access is allowed. Network access confinement can be through limiting network protocol use, limiting network destination address resolution or limiting domain name resolution, leading to network address resolution. In certain embodiments, a controlling entity such as an automated security monitor may utilize the invention to limit a user's present level of network access in a way that can inform a user of certain conditions and still allow a user access to a set of network destinations that may be helpful (for example in resolving the condition that led to reduced access).

Other embodiments of the present invention can also be used for other purposes relevant to a network access gateway such as allowing free access to chosen network content, but requiring additional payment or authorization for unrestricted access. An example of this is a public wireless network at a venue that wishes to provide free information about the venue via its own website or affiliated websites, yet requires payment for clients desiring general access to the Internet from the venue.

Figure 1:
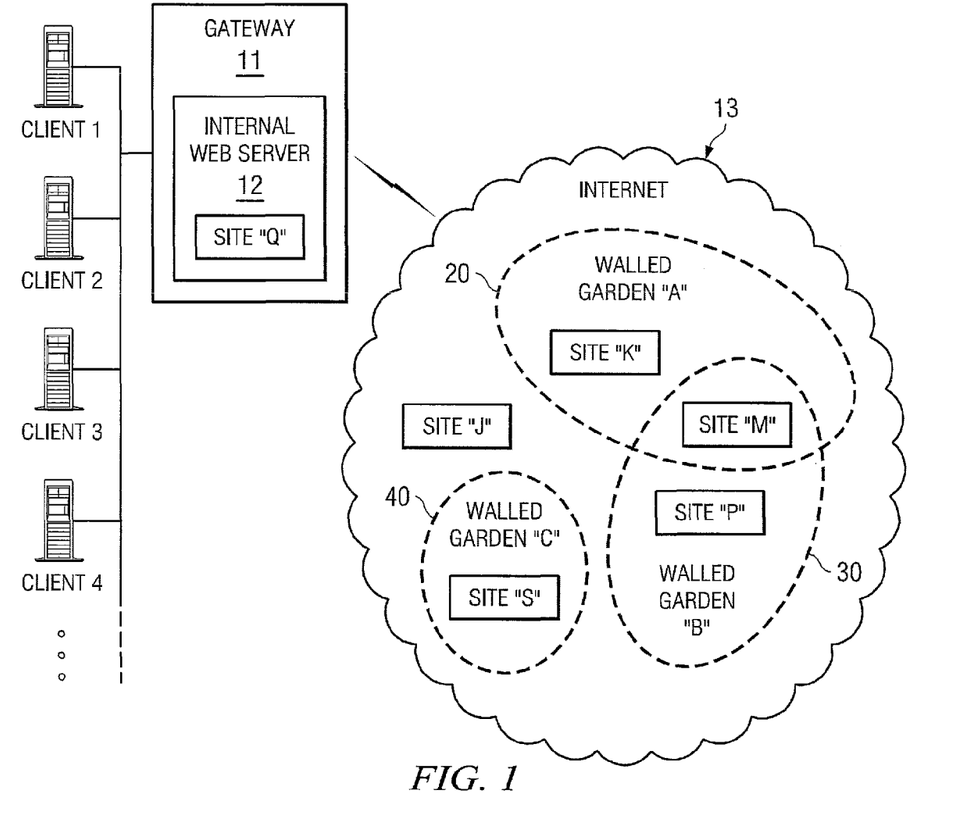
FIG. 1 is a diagrammatic representation of an example network in which embodiments of the present invention are employed.

FIG. 1 is a diagrammatic representation of a sample network topology illustrating an environment employing an embodiment of the present invention. It should be noted that FIG. 1 is provided by way of example only. In other embodiments of the present invention, the networks attached to the gateway 11 can be any networks known in the art including, but not limited to, LANs, WANs, the Internet, global communications networks, wireless networks and/or any other communications network known in the art.

Clients 1, 2, 3, 4 on LAN network 10 are connected to Internet 13 via gateway 11. All network traffic from clients 1, 2, 3, 4 bound for Internet 13 is handled by gateway 11. Client computers 1, 2, 3, 4 can comprise any computing device known in the art (e.g., desktop, laptop, PDA, mobile phone or any other device capable of network communication) and can be connected to gateway 11 in any manner known in the art (e.g., by LAN, wireless network, direct connection or other manner known in the art).

Gateway 11 may be operable to support any number of walled gardens 20, 30, 40 and any number of client classifications. Gateway 11 can assign clients 1, 2, 3, 4 to walled gardens 20, 30, 40 automatically based on facts known or learned at gateway 11, or the assignment can be done in response to external configuration or commands received at gateway 11.

At network access gateway 11, incoming network traffic is inspected for attributes that identify the traffic as associated with a particular client 1, 2, 3, 4. In one embodiment using the Linux operating system, this is done using the netfilter network packet subsystem by the application of iptables match rules that test for attributes such as IP address, MAC address, or the network interface on gateway 11 where the traffic arrived.

In one embodiment of the present invention, once incoming traffic is discriminated (and/or marked) on a per-client basis, traffic can be directed to, assigned to, or associated with, one or more sets of client-specific (or group-specific) access rules. Each access rule set serves to specify "walled garden" 20, 30, 40; definitions that consists of specifically allowed locations in an outside network. These lists can be manually constructed to contain selected websites (or other resources) that are relevant to the identified client or group. Each list's content may vary over time in response to external configuration or commands received.

Clients 1, 2, 3, 4 who are assigned to a walled garden 20, 30, 40 and whose traffic is not addressed to a location in an access list corresponding to the assigned walled garden 20, 30, 40 may have the traffic dropped, denied, or redirected by gateway 11. In one embodiment, when this errant traffic is a web browser request, gateway 11 can redirect the request thus causing display of an informational page in the requesting user's web browser. The page to which the request is redirected may be generated by gateway 11 itself, or it may instead be served from a remote location. The page can inform the user of his status in the access gateway and offer choices of action.

Figure 2:
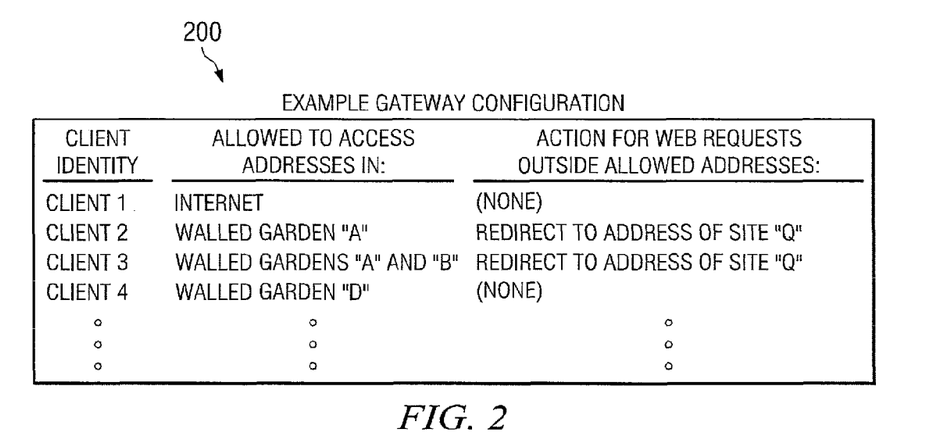
FIG. 2 is an example listing of gateway configuration details that specify per-client behavior, according to one embodiment of the present invention.

Turning now to FIG. 2 a representation of an example listing of gateway configuration details that specify per-client behavior is listing. Configuration 200 may be kept by gateway 11 and specify which walled garden 20, 30, 40 a client 1, 2, 3, 4 is associated with. Each client 1, 2, 3, 4 may be assigned a designated level of access. For example, the access granted to Client 2 includes only the destination addresses defined by the contents of the list indicated by "Walled Garden A" 20. The example configuration 200 may further specify what action, if any, should be taken if a client 1, 2, 3, 4 attempts to access a destination that is not specifically allowed. In the case of client 2, such a request would be redirected by gateway 11 to the address of site "Q". In this example, site "Q" is implemented by web server 12 internal to gateway 11.

The following set of results may occur if the listed actions were taken by clients as depicted with respect to FIGS. 1 and 2. These cases illustrate the ability of this embodiment to "quarantine" certain clients 1, 2, 3, 4 to particular walled garden(s) 20, 30, 40 while simultaneously allowing other clients 1, 2, 3, 4 unhindered access to the internet 13.

| Client Identity | Attempting to visit: | Result |
|---|---|---|
| Client 1 | Site "J" | Allowed |
| Client 1 | Site "K" | Allowed |
| Client 1 | Site "M" | Allowed |
| Client 1 | Site "P" | Allowed |
| Client 1 | Site "S" | Allowed |
| Client 2 | Site "J" | Redirected |
| Client 2 | Site "K" | allowed |
| Client 2 | Site "M" | allowed |
| Client 2 | Site "P" | redirected |
| Client 2 | Site "S" | redirected |
| Client 3 | Site "J" | Redirected |
| Client 3 | Site "K" | allowed |
| Client 3 | Site "M" | allowed |
| Client 3 | Site "P" | allowed |
| Client 3 | Site "S" | redirected |
| Client 4 | Site "J" | Dropped |
| Client 4 | Site "K" | dropped |
| Client 4 | Site "M" | dropped |
| Client 4 | Site "P" | dropped |
| Client 4 | Site "S" | allowed |

Utilizing an embodiment of the present invention the following scenario may occur: Client 1 is accessing the internet 13 without restrictions from gateway 11. The client 1 computer becomes infected with a worm. The worm creates excessive network traffic. The gateway 11 notices the abusive traffic and "quarantines" client 1. In one embodiment the gateway may detect this infection based on observed, detected behavior fitting a pattern that is suitable for constraint. By assigning the client to a walled garden reserved for infected users traffic from this client to destinations outside the walled garden becomes restricted.

The quarantined client may then attempt to browse a web page on the Internet. In response to this attempt, the gateway redirects the web request to a cooperating web server such as an internal web server on the gateway. The gateway's web server renders a web page informing the client of its perceived infection and offering links to self-help documents and to the websites of anti-virus vendors and the client's OS vendor. Thus, traffic from the client to the destination in the walled garden for infected users is allowed while other traffic is denied or redirected.

To control access of a client only to sites with a particular set of rules corresponding to a "walled garden", in some embodiments, network firewall technologies are employed to limit network protocol usage by a constrained client, while in other embodiments, network traffic filtering technologies are employed to limit network packet flow by the constrained client. In still other embodiments, network routing technologies are employed to limit network packet traversal by a constrained client.

Constraining a client may also involve analysis of a network protocol. In one embodiment, all network requests from a client in network protocols other than HTTP are denied if they emanate from a constrained client. In this embodiment, a constrained client may only access certain network regions accessible utilizing HTTP, and these network regions may contain content intended to rectify aberrant behavior by the constrained client. More specifically, these network regions may contain content or data intended to repair or enhance a network client's network access and permit renewed access to the other portions of a network by the client, perhaps through the application of security patches.

What is claimed is:

1. A method of network traffic quarantine control, comprising:
    at a network access gateway device between a local network and the Internet, selecting a client device in a first network segment of the network;
    at the network access gateway device, performing a plurality of quarantine control functions over the client device, wherein the plurality of quarantine control functions comprises:
    a) restricting all network traffic emanating from the client device to one or more network destination addresses that are not in or subordinate to the first network segment;
    b) restricting all network traffic emanating from the client device to an allowed network destination address to selected one or more network protocols; and
    rendering a web page to display on the client device from the network access gateway device, wherein the web page contains an offer for a user of the client device to perform an action in order to obtain unrestricted access to the Internet responsive to implementation of one of the plurality of quarantine control function of the client device.

2. The method according to claim 1, wherein the action requires the user to obtain and execute abnormal behavior scanning software from a server machine running at one of the one or more allowed network destination addresses.

3. The method according to claim 1, further comprising:
    evaluating network traffic emanating from the client device after the client device has been scanned and abnormal behavior has been removed, mitigated or rendered inert.

4. The method according to claim 1, further comprising:
    filtering the network traffic emanating from the client device to limit network packet flow by the client device.

5. The method according to claim 1, further comprising:
    routing the network traffic emanating from the client device to limit network packet traversal by the client device.

6. The method according to claim 1, wherein the plurality of quarantine control functions further comprises:
   restricting all network traffic emanating from the client device to one or more network destination addresses in one or more network segments that are not in or subordinate to the first network segment.

7. The method according to claim 1, further comprising:
   performing all of the plurality of quarantine control functions over the client device.

8. A computer program product comprising at least one non-transitory computer readable medium storing instructions translatable by at least one processor to perform:
   a plurality of quarantine control functions over a client device coupled to the network access gateway device, wherein the network access gateway device is between a local network and the Internet, wherein the client device is in a first network segment of the network, and wherein the plurality of quarantine control functions comprises:
   a) restricting all network traffic emanating from the client device to one or more network destination addresses that are not in or subordinate to the first network segment;
   b) restricting all network traffic emanating from the client device to an allowed network destination address to selected one or more network protocols; and
   rendering a web page to display on the client device from the network access gateway device, wherein the web page contains an offer for a user of the client device to perform an action in order to obtain unrestricted access to the Internet responsive to the implementation of one of the plurality of quarantine control function of the client device.

9. The computer program product of claim 8, wherein the action requires the user to obtain and execute abnormal behavior scanning software from a server machine running at one of the one or more allowed network destination addresses.

10. The computer program product of claim 8, wherein the instructions are further translatable by the at least one processor to perform:
    evaluating network traffic emanating from the client device after the client device has been scanned and abnormal behavior has been removed, mitigated or rendered inert.

11. The computer program product of claim 8, wherein the instructions are further translatable by the at least one processor to perform:
    filtering the network traffic emanating from the client device to limit network packet flow by the client device.

12. The computer program product of claim 8, wherein the instructions are further translatable by the at least one processor to perform:
    routing the network, traffic emanating from the client device to limit network packet traversal by the client device.

13. The computer program product of claim 8, wherein the plurality of quarantine control functions further comprises:
    restricting all network traffic emanating from the client device to one or more network destination addresses in one or more network segments that are not in or subordinate to the first network segment.

14. The computer program product of claim 8, wherein the instructions are further translatable by the at least one processor to perform:
    all of the plurality of quarantine control functions over the client device.

15. A network access gateway device, comprising:
    at least one processor; and
    at least one non-transitory computer readable medium storing instructions translatable by the at least one processor to perform:
    a plurality of quarantine control functions over a client device coupled to the network access gateway device, wherein the network access gateway device is between a local network and the Internet, wherein the client device is in a first network segment of the network, and wherein the plurality of quarantine control functions comprises:
    a) restricting all network traffic emanating from the client device to one or more network destination addresses that are not in or subordinate to the first network segment;
    b) restricting all network traffic emanating from the client device to an allowed network destination address to selected one or more network protocols; and
    rendering a web page to display on the client device from the network access gateway device, wherein the web page contains an offer for a user of the client device to perform an action in order to obtain unrestricted access to the Internet responsive to implementation of one of the plurality of quarantine control function of the client device.

16. The system of claim 15, wherein the action requires the user to obtain and execute abnormal behavior scanning software from a server machine running at one of the one or more allowed network destination addresses.

17. The system of claim 15, wherein the instructions are further translatable by the at least one processor to perform:
    evaluating network traffic emanating from the client device after the client device has been scanned and abnormal behavior has been removed, mitigated or rendered inert.

18. The system of claim 15, wherein the instructions are further translatable by the at least one processor to perform:
    filtering the network traffic emanating from the client device to limit network packet flow by the client device.

19. The system of claim 15, wherein the instructions are further translatable by the at least one processor to perform:
    routing the network traffic emanating from the client device to limit network packet traversal by the client device.

20. The system of claim 15, wherein the plurality of quarantine control functions further comprises:
    restricting all network traffic emanating from the client device to one or more network destination addresses in one or more network segments that are not in or subordinate to the first network segment.

* * * * *

UNITED STATES PATENT AND TRADEMARK OFFICE
CERTIFICATE OF CORRECTION

PATENT NO. : 8,543,710 B2
APPLICATION NO. : 11/076591
DATED : September 24, 2013
INVENTOR(S) : Turley et al.

It is certified that error appears in the above-identified patent and that said Letters Patent is hereby corrected as shown below:

On Title Page 3, item (56), under "OTHER PUBLICATIONS", Column 2, Line 29, delete "Retransmssion" and insert -- Retransmission --, therefor.

On Title Page 3, item (56), under "OTHER PUBLICATIONS", Column 2, Line 33, delete "Survery" and insert -- Survey --, therefor.

On Title Page 4, item (56), under "OTHER PUBLICATIONS", Column 1, Line 31, delete "Protoccol:" and insert -- Protocol: --, therefor.

In the Specification:

In Column 3, Line 43, delete "Theses" and insert -- These --, therefor.

In Column 5, Line 29, delete "20, 30 , 40" and insert -- 20, 30, 40 --, therefor.

In the Claims:

In Column 7, Line 51, in Claim 12, delete "network," and insert -- network --, therefor.

Signed and Sealed this
Second Day of September, 2014

Michelle K. Lee
*Deputy Director of the United States Patent and Trademark Office*